US008150671B2

(12) United States Patent
Quezada et al.

(10) Patent No.: US 8,150,671 B2

(45) Date of Patent: Apr. 3, 2012

(54) PORTABLE USB POWER MODE SIMULATOR TOOL

(75) Inventors: Juan M. Quezada, Lerma (MX); Robert F. Kirchhoff, Macomb, MI (US); Robert A. De Stefano, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 356 days.

(21) Appl. No.: 12/432,886

(22) Filed: Apr. 30, 2009

(65) Prior Publication Data

US 2010/0280813 A1 Nov. 4, 2010

(51) Int. Cl.
*G06F 17/50* (2006.01)

(52) U.S. Cl. .......................... 703/13; 307/10.5; 307/10.6

(58) Field of Classification Search ................ 703/8, 13, 703/16, 19, 20, 21, 22, 23, 24, 25; 434/29, 434/62; 307/10.5, 10.6

See application file for complete search history.

(56) References Cited

U.S. PATENT DOCUMENTS 4,516,543 A * 5/1985 Abe et al. ................. 123/179.21
5,056,023 A * 10/1991 Abe ................................ 701/32
5,094,198 A * 3/1992 Trotta et al. .............. 123/179.21
5,553,488 A * 9/1996 Ishii et al. .................. 73/114.61
5,607,308 A * 3/1997 Copperman et al. ............ 434/62
5,635,841 A * 6/1997 Taylor ........................... 324/380
5,659,291 A * 8/1997 Kennedy et al. .............. 340/457
5,660,547 A * 8/1997 Copperman ..................... 434/29
5,844,469 A * 12/1998 Regazzi et al. .......... 340/426.35
5,845,221 A * 12/1998 Hosokawa et al. ............. 701/36
5,905,315 A * 5/1999 Lefebvre et al. ............. 307/10.6
6,146,143 A * 11/2000 Huston et al. ................... 434/69
6,314,375 B1 * 11/2001 Sasaki et al. ..................... 702/34
6,392,315 B1 * 5/2002 Jones et al. .................. 307/10.6
6,479,908 B1 * 11/2002 Utter et al. ................... 307/10.3
6,516,251 B1 * 2/2003 Chene et al. ....................... 701/1
6,566,816 B2 * 5/2003 Fushimi et al. ................. 315/82
6,573,615 B1 * 6/2003 Asakura et al. ................ 307/9.1
6,707,169 B2 * 3/2004 Shimizu et al. ............. 290/40 C
6,877,490 B2 * 4/2005 Nishioka et al. .............. 123/520
6,925,427 B1 * 8/2005 Montgomery .................. 703/13
7,057,240 B2 * 6/2006 Topp et al. ..................... 257/370
7,078,829 B2 * 7/2006 Hunninghaus et al. ...... 307/10.6
7,145,264 B2 * 12/2006 Nagae et al. ................. 307/10.2
7,252,062 B2 * 8/2007 Hiramatsu ............. 123/142.5 E
7,424,414 B2 * 9/2008 Craft ................................ 703/8
7,531,852 B2 * 5/2009 Ueda et al. ..................... 257/203
7,539,610 B2 * 5/2009 Imada et al. ..................... 703/28
7,751,946 B2 * 7/2010 Taki et al. ......................... 701/2
2003/0195720 A1 * 10/2003 Quinnett et al. .............. 702/185
2004/0167761 A1 * 8/2004 Sizov ................................ 703/8
2005/0017724 A1 * 1/2005 McQueeney .................. 324/380
(Continued)

*Primary Examiner* — Kamini S Shah
*Assistant Examiner* — Kibrom Gebresilassie
(74) *Attorney, Agent, or Firm* — Quinn Law Group, PLLC

(57) ABSTRACT

A simulation tool includes a printed circuit board assembly or PCBA having a built-in USB communication port and a microcontroller. A host computer transmits user-selected configuration data to the microcontroller, which transforms the data into solid-state signals. These are provided to a power master module in an electrical bench or a test vehicle. A method of simulating a low-current ignition switch that is usable with the PMM includes transmitting user-selectable configuration data from a host computer to a PCBA having a microcontroller, transforming the configuration data into a set of solid-state signals simulating a desired set of power mode parameters, and transmitting the solid-state signals to the PMM to thereby simulate an operation of the low-current ignition switch.

18 Claims, 4 Drawing Sheets

U.S. PATENT DOCUMENTS

2005/0274982 A1* 12/2005 Ueda et al. .................... 257/202
2005/0275988 A1* 12/2005 Hunninghaus et al. ......... 361/92
2006/0259286 A1* 11/2006 Sofer ................................ 703/8
2007/0184719 A1* 8/2007 Ni et al. ........................ 439/610
2007/0289855 A1* 12/2007 Schumacher et al. ........ 200/237
2008/0052049 A1* 2/2008 Moriyama et al. ................ 703/2
2010/0100365 A1* 4/2010 Moriyama ........................ 703/8
2010/0146256 A1* 6/2010 Luo et al. .......................... 713/2
2010/0279186 A1* 11/2010 Kanie ........................... 429/429
2010/0310953 A1* 12/2010 Yumiya et al. ................ 429/429

* cited by examiner

PORTABLE USB POWER MODE SIMULATOR TOOL

TECHNICAL FIELD

The present invention relates generally to electronic measurement devices used in diagnosing and validating vehicle systems, and in particular to a portable tool for automatically simulating multiple ignition cycles of a vehicle having a low-current ignition switch.

BACKGROUND OF THE INVENTION

During the design and launch of a new vehicle, the integration and validation of electronic components that utilize serial communications, i.e., that sequentially transmit data one bit at a time over a communications channel, can be a challenging task. For example, a low-current ignition switch uses such serial architecture during the start and stop of the vehicle engine. The position of the ignition switch is typically detected and communicated to all electronic modules aboard the vehicle over a serial data link(s), normally by way of a power mode master (PMM) or a body control module (BCM) that automatically monitors and updates the ignition switch position in cycles of less than approximately 25 milliseconds.

During vehicle launch, engine start/stop is a state or condition that at times can be linked as a potential trigger event for certain vehicular electrical system failure modes, modes that are quite often highly intermittent and difficult to isolate and diagnose. Investigation teams are ordinarily assigned to identify the root cause of any failure modes during vehicle development. With respect to highly variable ignition switch activation times, electrical benches and/or test vehicles can be subjected to a series of repetitive ignition cycles in an attempt at reproducing the failure mode.

Interaction of onboard serial data communications systems and diagnostic software during initialization can sometimes induce failures that can be particularly challenging to diagnose and isolate due to their highly intermittent nature. Normal vehicle validation processes and timelines allow for only a limited number of ignition test cycles, thus making such conventional diagnostic and validation methods less than optimal.

SUMMARY OF THE INVENTION

Accordingly, a portable simulator tool enables automated ignition cycle simulation in certain vehicles having a low-current ignition switch. The tool increases the confidence and quality of software validation processes by allowing a much greater relative number of vehicle test scenarios. A computer-based user interface facilitates the setup of ignition cycle configuration and sequencing, thus allowing for repetitive cycling of a system power mode. By simulating a low-current vehicle ignition switch, such as a Discrete Logic Ignition Switch (DLIS), solid-state signals can be provided with low voltage levels, and with timing delays or resolution greater than approximately 1 millisecond (ms).

The tool can be used with existing electrical system test benches as well as with test vehicles during vehicle development and validation to provide a low cost solution, and is compatible with desktop and laptop computers having a USB interface or port configuration. Operation of the tool can be readily updated simply by changing or modifying the software executed by a host computer, and used for the control of an electronic board or printed circuit board assembly (PCBA) within the tool. The tool can thus be used in system durability tests and troubleshooting to confirm the robustness of vehicle operation.

In particular, the tool includes an electronic board or printed circuit board assembly (PCBA), which in one exemplary embodiment is based on a PIC18F4550 microcontroller available from Microchip Technologies, Inc., headquartered in Chandler, Ariz. The PCBA has a built-in USB communication port or other USB communications capability. Software is resident within or accessible by a host machine or computer, and is suitable for controlling and transmitting a set of solid-state signals simulating operation of a low-current ignition switch. The software code can be updated in minutes to modify the operation of the system or the parameters of the test. The ignition switch signals are thus transmitted to the power mode master (PMM) inputs in an electrical bench or a test vehicle, with the PMM frequently embodied as and therefore referred to hereinafter as a Body Control Module or BCM.

A method of simulating a low-current ignition switch that is usable with a vehicle power master module (PMM) includes transmitting user-selectable configuration data from a host computer to a printed circuit board assembly (PCBA) having a microcontroller, transforming the configuration data into a set of solid-state signals simulating a desired set of power mode parameters, and transmitting the solid-state signals to the PMM or BCM to thereby simulate an operation of the low-current ignition switch.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
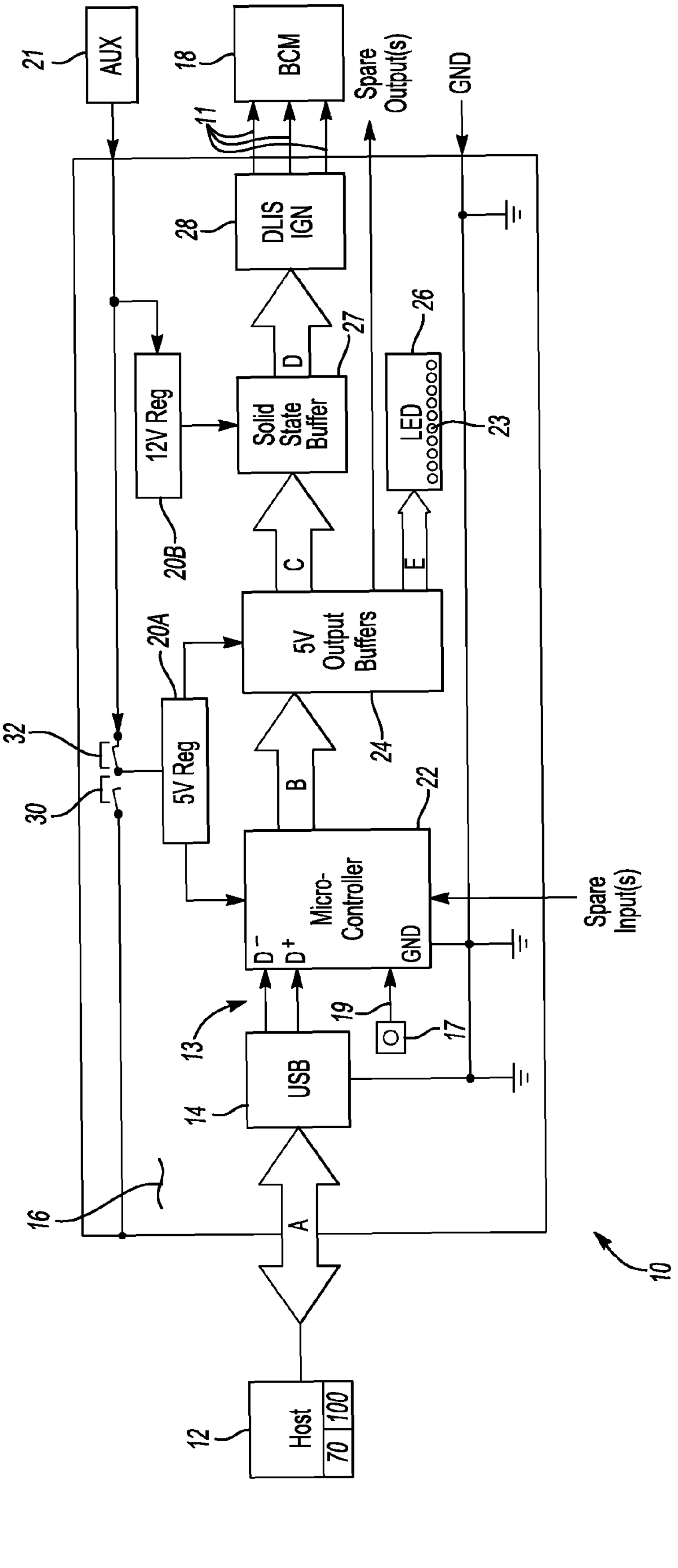
FIG. 1 is a schematic block diagram of a portable simulation tool in accordance with the invention.

Referring to the drawings, wherein like reference numbers correspond to like or similar components throughout the several figures, and beginning with FIG. 1, a diagnostic system or portable tool 10 is configured for generating and transmitting a set of solid-state signals 11 along the communications path generally indicated by the arrows B-D for the simulation of the operation and functionality of a low-current vehicular ignition switch. Such a low-current ignition switch is embodied as a Discrete Logic Ignition Switch or DLIS according to an exemplary embodiment, or any other ignition switch design having a low threshold current. The solid-state signals 11 have a voltage range of approximately 3-volts to approximately 12-volts, according to an exemplary embodiment. The tool 10 is in communication with a host computer or host 12, such as a desktop computer, laptop, or other suitable portable or stationary electronic device, and a test vehicle or bench having a power mode master (PMM), referred to hereinafter as a body control module (BCM) 18.

The host 12 can be configured as a digital computer having a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Any algorithms resident in host 12 or accessible thereby, including an ignition switch simulation algorithm 100 and software 70 in accordance with the invention as described below, can be stored in ROM and executed to provide the respective functionality.

The tool 10 can be powered by an external source such as the host 12 and/or an auxiliary battery (AUX) 21, and thus features a pair of voltage regulators 20A, 20B. The voltage regulator 20A can be configured as a 5-volt regulator, such that the tool 10 can be powered by a 5-volt signal input from a Universal Serial Bus (USB) port 14. The voltage regulator 20B is a 12-volt regulator, such that the tool 10 can be powered via the auxiliary battery 21 as described below.

The host 12 includes the computer-executable algorithm 100 for providing the necessary functionality as set forth below. Within the scope of the invention, the algorithm 100 can be considered as part of the tool 10 although resident within the host 12. The tool 10 includes an electronic board or printed circuit board assembly (PCBA) 16. The PCBA 16 includes the USB port 14 mentioned above, which is in communication with the host 12 to draw 5-volt electrical power from the host 12 as needed. The PCBA 16 also includes a microcontroller 22 in communication with the USB port 14, with the PCBA 16 receiving instructions, code, or signals downloaded from the host 12 via the USB port 14, and for transmitting data back to the host 12 as set forth below.

Still referring to FIG. 1, the USB port 14 and USB capabilities should be compliant with at least the USB 2.0 specification in order to provide sufficiently rapid data transfer rates. A wired or wireless interface (arrow A) between the host 12 and the tool 10 serves two primary purposes: (1) to provide control of the PCBA 16 to simulate ignition switch signals 11 transmitted or relayed to the BCM 18, and (2) to download software or code for execution by the PCBA 16, such that a microcontroller 22 can be quickly and easily re-programmed via software 70 loaded on the host 12.

According to an exemplary embodiment, the microcontroller 22 can be a programmable microcontroller device having at least 32 Kbytes of flash program memory and at least 2 Kbytes of general-purpose static random access memory or SRAM. The microcontroller 22 can be specifically embodied as a PIC18F4550 available from Microchip Technologies, Inc., headquartered in Chandler, Ariz., although other microcontroller devices having a built-in, full-speed USB 2.0 or higher interface and providing the functionality set forth herein can also be used without departing from the intended scope of the invention.

The USB port 14 is configured as a type B connector, wherein any "A-to-B" type connector cable can be plugged into, with the flat connector leading to the host computer 12 across the path indicated by arrow A in FIG. 1. As will be understood by those of ordinary skill in the art, there are four connections in a USB cable. Two of these connections supply 5-volt power to the PCBA 16, while the other two are the communications lines 13, also marked as D+ and D− on the connected microcontroller 22. In this manner, information can be freely transferred from the host 12 to the microcontroller 22, and from the microcontroller 22 to the rest of the PCBA 16 as needed.

The PCBA 16 also includes an ignition switch connector 28 which allows the generated ignition switch signals to be connected to a power mode master or PMM, such as the BCM 18. As will be understood by those of ordinary skill of the art, on vehicles that have several control modules connected by serial data circuits, one such module is generally referred to as the power mode master or PMM. On vehicles having one main body controller (BCM), the BCM has this responsibility. Therefore, the BCM 18 can be used for this purpose, and will be used hereinafter synonymously with the term PMM.

An oscillator circuit (O) 17 provides a clock signal 19 to the microcontroller 22, and can include a set of capacitors and resistors (not shown) suitably arranged to provide a desired oscillation. According to an exemplary embodiment, the set of capacitors are approximately 15 pF each, the resistors are approximately 1 Mohm each, and the oscillation produced by these electronic components is approximately 20 MHz. However, variations of these values producing the desired outcome could also be used without departing from the intended scope of the invention.

Still referring to FIG. 1, when power is provided to the PCBA 16, a light-emitting diode (LED) 23 of an LED bank 26 is lit. In some circuits, USB power cannot be used if more than 100 MA of current is required, which is the maximum amount of current drawn from a single USB port. The voltage regulators 20A and 20B are provided for this purpose, as noted above. Two buttons 30 and 32 can be used during the process of programming an application. The button 30 is configured as a reset button, and the button 32 is configured as a program button. Pushing or depressing button 30 is the equivalent of unplugging a USB cable between the host 12 and USB connector 14 and plugging it back in again, a step which would cause the host 12 to recognize the PCBA 16 and initialize any corresponding drivers. When the button 30 is pushed at the same time as button 32, the tool 10 enters a predetermined mode which allows a new application to be loaded into the microcontroller 22.

The 5-volt regulator 20A is adapted for boosting a 5-volt signal to the tool 10, and it can be connected to the battery 21 or to an auxiliary power adapter. That is, the PCBA 16 can be selectively powered using 5-volt power from the host 12 as noted above. The 12-volt regulator 20B receives power from the auxiliary battery 21, e.g., a 12-volt vehicle or bench battery, and serves as protection to a set of solid-state buffers 27 described below with reference to FIG. 2. The regulator 20B also ensures a maximum voltage of 12-volts. A set of output buffers 24 are configured as 5-volt buffers serving specific functions. One is used for activating select LED of the LED bank 26, while another is used for controlling inputs to the solid-state buffers 27.

Figure 2:
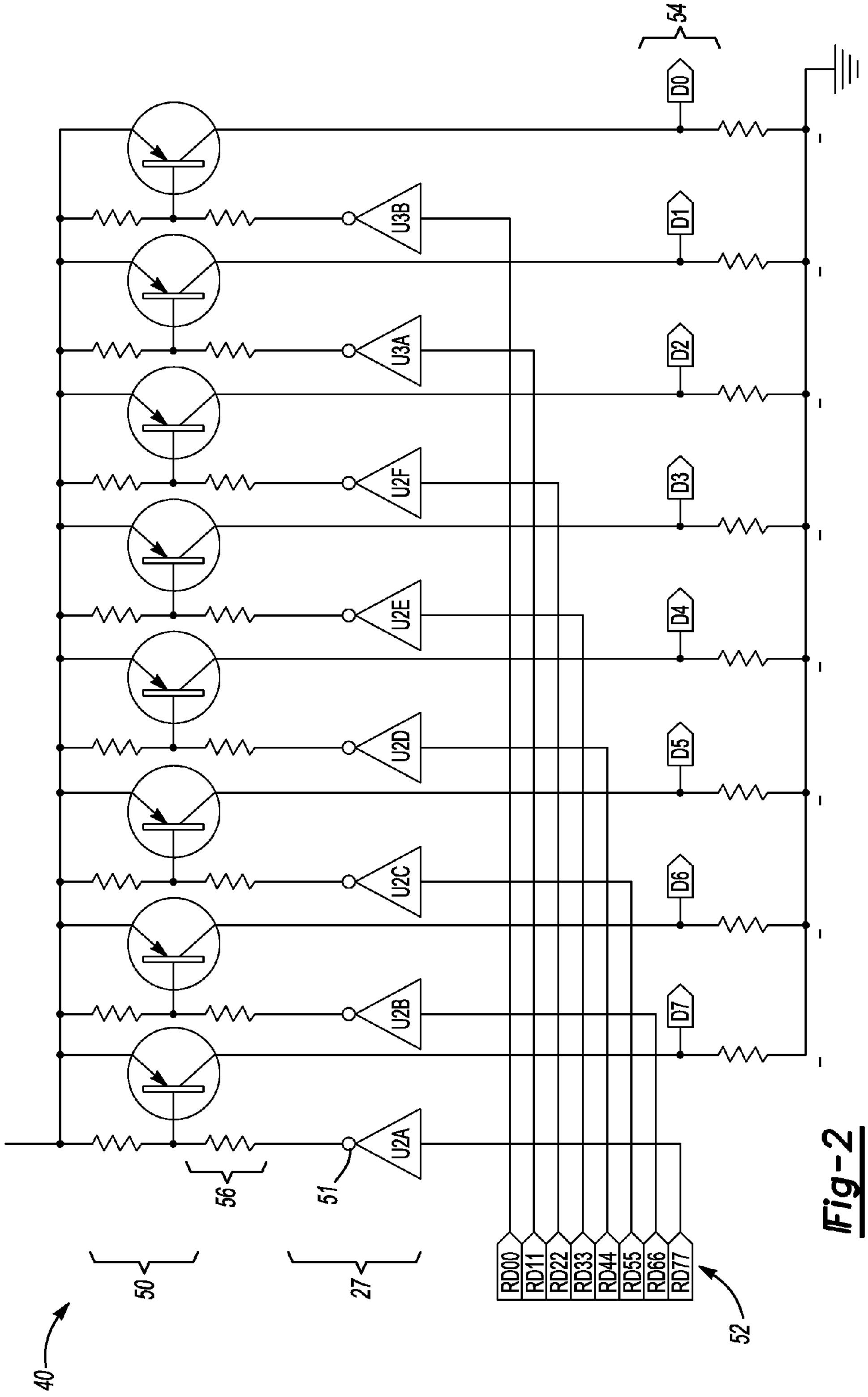
FIG. 2 is a schematic electrical circuit diagram describing a portion of the circuitry of the portable tool of FIG. 1.

Referring to FIG. 2, in order to provide the required ignition switch simulation signals 11, the solid-state buffers 27 are used. For signals with voltage levels of 0-volts or 12-volts, i.e., RUN and ACC lines in a typical ignition switch application, a circuit 40 having a plurality of PNP small signal transistors 50 can be used. The solid-state buffers 27 can be configured as I.C. 7406-type inverter buffers (i.e., U2 and U3) that feature open collector outputs 51 to selectively prevent any current from flowing to the transistors 50, while the digital inputs 52 (i.e., RD00-RD77) to the buffers 27 are connected to the input of each solid-state buffer 27. The output of each solid-state buffer 27 is directed via the transistors 50 (i.e., T1-T8) each capable of supporting 800 mA of current. Finally, each one of a set of pull-down outputs 54 (i.e., D0-D7) of the transistors 50 are connected to a resistor

56, here shown as exemplary 10 Kohm resistors, in order to provide only two discrete voltage levels, i.e., 0-volts and 12-volts.

Figure 3:
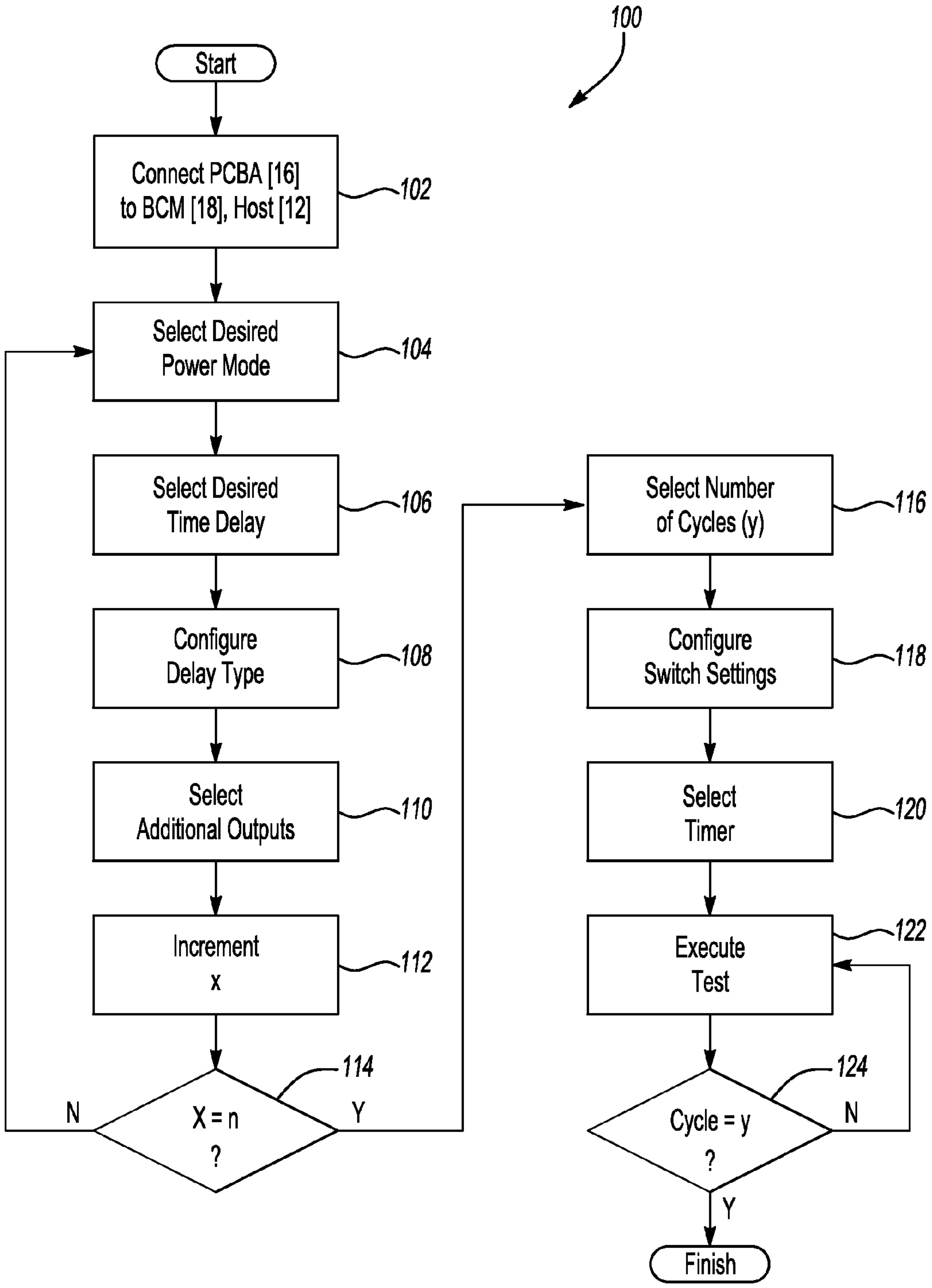
FIG. 3 is a graphical flow chart describing a method of simulating a vehicular ignition cycle using the tool of FIG. 1.

Referring to FIG. 3, a method or algorithm 100 of simulating a low-current ignition switch can be used with the tool 10 shown in FIG. 1, and will now be described with reference to the various elements or components of the tool 10. The algorithm 100 starts with step 102, wherein a USB cable is connected between the host 12 and the USB connector 14, thereby connecting the host 12 to the tool 10. Once the connection has been sensed or detected by the host 12, the tool 10 is connected to a power master module, e.g., the BCM 18, as noted above.

The algorithm 100 continues with step 104 once all of the electrical connections have been properly established. Step 102 can be considered preparatory to execution of the algorithm 100, although it is included herein within the context of algorithm 100 in order to illustrate the proper order of the electrical interconnection of the host 12, tool 10, and BCM 18.

At step 104, the algorithm 100 is initiated or launched by opening the software 70. According to an exemplary embodiment, a plurality (x) of different power mode simulations can be user-selected. The user therefore selects or chooses a desired power mode from a pull-down menu or other user-friendly graphical interface. For example, referring to FIG. 4, a main display screen 80 can present a plurality of different experiment or process steps 82, numbered 1-8 for clarity although more or fewer steps 82 can be used without departing from the intended scope of the invention. Each step 82 has a power mode option. Multiple switch positions can be provided in pull-down form as shown, such as: "OFF AWAKE KO", i.e., "key out", which can indicate that a key is outside of a key cylinder in a simulated ignition switch, "OFF AWAKE KI", i.e., the key is positioned within the cylinder, i.e., "key in", "ACCESSORY", i.e., the key is positioned in the cylinder at a first on position, "RUN", i.e., the key is position in the cylinder at a second on position, and "CRANK", i.e., the key is positioned in the cylinder at a third on position. A desired switch position can therefore be selected, and in any desired order, to simulate a unique set of load characteristics or a predetermined test configuration. Once the key position is set at a first experiment step 82, the algorithm 100 continues to step 106.

At steps 106 and 108 the user selects a desired time delay and delay type, respectively. Referring again to FIG. 4, a time delay option 84 allows the user to select a fixed timer option or a random timer option, as well as the number of milliseconds for the delay when fixed is selected. Delays of several thousands of ms are possible, with as little as 1 ms resolution. Once the time delay option 84 has been selected, the algorithm 100 proceeds to step 110.

At step 110, if desired additional or extra outputs can be selected or commanded on or off at the same time as the switch function selected at step 104. Such additional outputs can be useful to provide additional trigger signals. After selecting the desired additional outputs, the algorithm 100 proceeds to step 112.

At step 112, which is represented in FIG. 3 as "increment x", the algorithm 100 looks for the next data entry, as explained above with reference to step 104. That is, each experiment step 82 is expected to be completed before proceeding to selection of the next step 82. Optionally, subsequent experiment steps could be ghosted to prevent data entry until a preceding experiment step 82 is completed. Thus, a user desiring something less than the total number of available experiment steps for a given simulation can complete data entry for only the desired number experiment steps 82, without affecting the performance of the algorithm 100, and without requiring the user to fill in all of the fields for any extra experiment steps 82.

Figure 4:
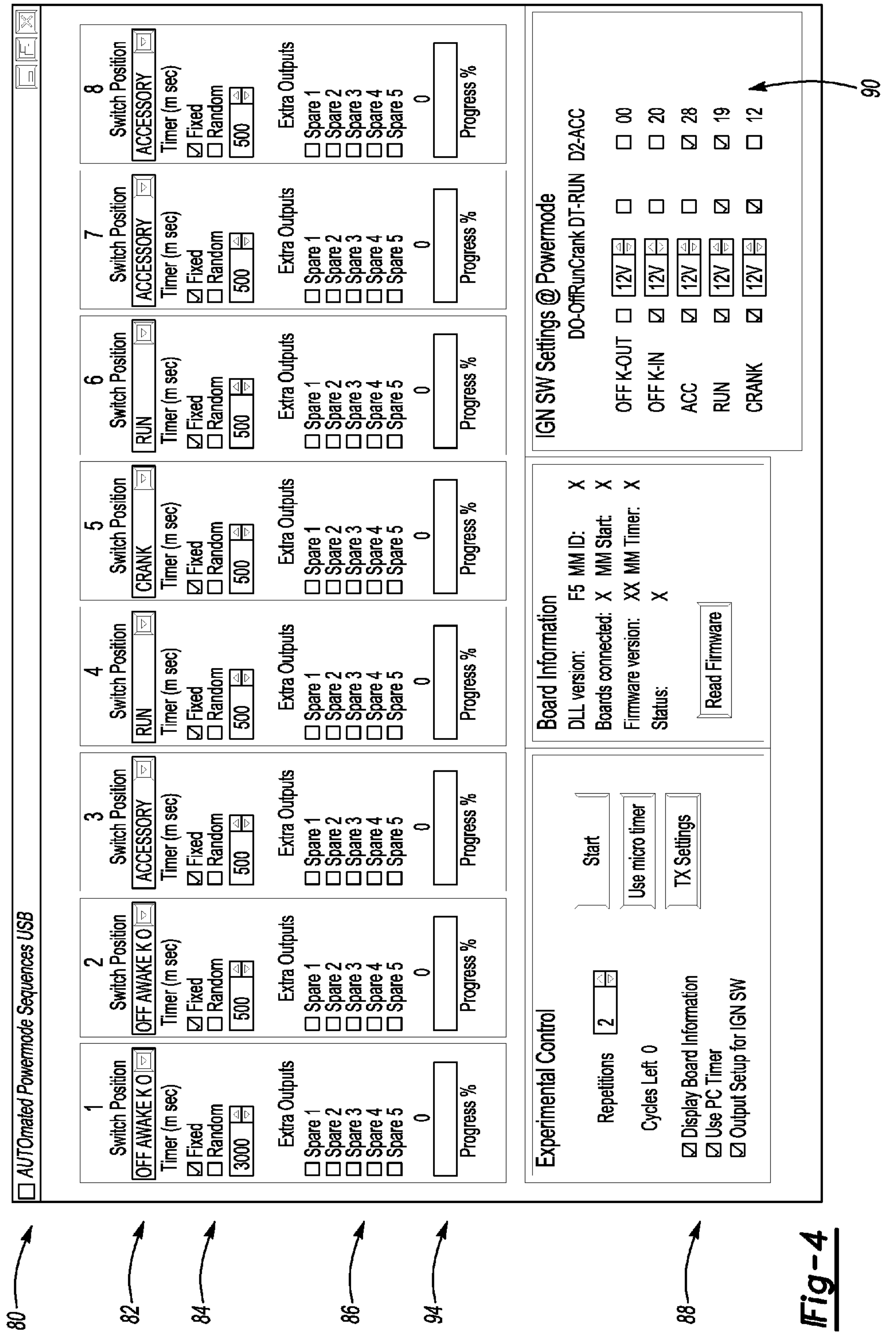
FIG. 4 is an image of an exemplary display screen usable with a host computer of the tool shown in FIG. 1.

At step 114, the algorithm 100 checks to see if the present number of completed steps 82 equals the total number, i.e., a user completing data entry for one power mode still has seven remaining power modes to select based on the exemplary eight-field embodiment shown in FIG. 4. Therefore, the user is prompted to fill in the next experiment step 82, with step 114 continuing in a loop with steps 104-112 until the total number of available experiment steps 82 have been completed, or alternately until a desired number have been completed as explained above. Optionally, the algorithm 100 can execute only those experiment steps 82 that have a complete set of corresponding data at 84 and 86, disregarding the experiment steps 82 having an incomplete data field.

At step 116, experiment control is refined by selecting a desired number of cycles for execution. Referring again to FIG. 4, the "experiment control" fields 88 can include a "repetitions" field having a pull down menu or other suitable graphical user interface. The algorithm 100 then proceeds to step 118.

At step 118, the user is prompted to configure the desired ignition switch settings. In FIG. 4, such a field is represented as "IGN SW Settings" at 90. Field 90 allows a user to select or configure ignition switch voltage levels and activation for each of the experiment steps 82 selected at step 104. Enablement/disablement of ignition lines (OFF/RUN/CRANK, RUN, ACC) can be selected based on the particular specification of the software 70 to match different low-current ignition switches. The algorithm 100 then proceeds to step 120.

At step 120, the algorithm 100 records a timer type which is selected by a user. The user can select from the timer aboard the host 12, i.e., a computer timer, when the delays are requested at longer than 100 ms. A microcontroller timer option can provide more accurate delays of multiples of 1 ms. Such an option can be displayed within the experiment control field 88 shown in FIG. 4. The algorithm 100 then proceeds to step 122.

At step 122, the user can start the simulation by pressing the start button shown in FIG. 4. Execution of the simulation thus commences, continuing automatically in a loop with step 124 until the required number of cycles (y) have been completed for each power mode 82 of FIG. 4. A progress bar 94 can be used to graphically display the percentage of progress to the user via a display portion of the host 12.

While the best modes for carrying out the invention have been described in detail, those familiar with the art to which this invention relates will recognize various alternative designs and embodiments for practicing the invention within the scope of the appended claims.

The invention claimed is:

1. A portable tool operable for simulating a low-current ignition switch and usable with a vehicle power master module (PMM), the tool comprising:

a printed circuit board assembly (PCBA) having:

- a USB port that is connectable to a host computer and configured for receiving user-selectable configuration data from the host computer, including a predetermined set of switch positions for the low-current ignition switch;
- a microcontroller in communication with the USB port and configured for transforming the configuration data into a set of solid-state signals; and
- a circuit in electrical communication with the microcontroller, the circuit having a set of solid-state buffers and transistors, wherein the circuit receives the solid-state signals from the microcontroller and selectively transmits one of two discrete voltages as an output to the PMM in response to receiving the solid-state signals; and an algorithm downloadable to and executable by the microcontroller, wherein the algorithm includes the configuration data;

wherein the microcontroller is configured to transmit the set of solid-state signals to the solid-state buffers and transistors to thereby simulate the predetermined set of switch positions of the low-current ignition switch.

2. The tool of claim 1, wherein the set of solid-state signals has a timing delay or interval greater than 1 millisecond.

3. The tool of claim 1, wherein the low-current ignition switch is configured as a Discrete Logic Ignition Switch (DLIS).

4. The tool of claim 1, wherein the microcontroller is configured as a PIC18F4550 device.

5. The tool of claim 1, wherein the PMM is configured as one of a Body Control Module (BCM) of a vehicle and a portion of a test bench.

6. The tool of claim 1, wherein the configuration data includes a desired power mode, a desired delay time for the desired power mode, and a number of required cycles.

7. A portable tool operable for simulating a low-current ignition switch and usable with a vehicle power master module (PMM), the tool comprising:

a printed circuit board assembly (PCBA) having a USB port configured for receiving configuration data from a host computer, a microcontroller configured for transforming the configuration data into a set of solid-state signals of between 3 volts (V) and 12V, a circuit including a solid-state buffers and transistors for selectively providing one of two discrete voltages to the PMM in response to the solid-state signals, wherein one of the two discrete voltages is 0V and the other discrete voltage is between 3V and 12V;

an algorithm downloadable to and executable by the microcontroller, wherein the algorithm includes the configuration data, and wherein the configuration data includes a plurality of user-selectable values including a desired power mode and a desired number of cycles of the low-current ignition switch;

wherein the microcontroller is configured to transmit the set of solid-state signals to the circuit to thereby simulate an operation of the low-current ignition switch.

8. The tool of claim 1, wherein the circuit includes a plurality of a PNP small signal transistors, and the plurality of solid-state buffers includes inverter buffers having open collector outputs which selectively prevent current from flowing to the PNP small signal transistors when providing 0V to the PMM as the discrete voltage.

9. The tool of claim 8, wherein the solid-state buffers are configured as I.C. 7406-type inverter buffers.

10. The tool of claim 8, wherein the transistors are each configured for supporting 800 mA of electrical current.

11. The tool of claim 8, wherein an output of each transistor is connected to a different 10 Kohm resistor to provide only one of the two discrete voltages at an output of the PCBA.

12. The tool of claim 10, wherein the two discrete voltages are 0-volts and 12-volts.

13. A method of simulating a low-current ignition switch that is usable with a vehicle power master module (PMM), the method comprising:

connecting a printed circuit board assembly (PCBA) to each of a 5volt (V) power supply and a 12V power supply;

transmitting user-selectable configuration data from a host computer to a printed circuit board assembly (PCBA) having a microcontroller and a circuit having a set of solid-state buffers and transistors;

transforming, via the microcontroller, the configuration data into a set of solid-state signals of between 3V and 12 V for simulating a desired set of power mode parameters; and transmitting one of two discrete voltages from the circuit to the PMM to thereby simulate an operation of the low-current ignition switch, wherein the two discrete voltages includes 0V and the voltage level of the solid-state signals.

14. The method of claim 13, wherein the PMM is configured as a Body Control Module (BCM) of a vehicle.

15. The method of claim 13, wherein transmitting user-selectable configuration data from a host computer to a PCBA includes transmitting the configuration data over a USB connection to a USB port that is built-in to the PCBA.

16. The method of claim 13, wherein transforming the configuration data includes processing the configuration data using a plurality of a PNP small signal transistors and a plurality of solid-state inverter buffers that are each electrically connected to a respective one of the PNP small signal transistors.

17. The method of claim 16, wherein the solid-state buffers are configured as I.C. 7406-type inverter buffers that each feature an open collector output for selectively preventing a flow of current from the solid-state buffers to the transistors.

18. The method of claim 13, wherein the configuration data includes a desired power mode selected from the group consisting essentially of: OFF, AWAKE, ACCESSORY, RUN, and CRANK.

* * * * *